(12) United States Patent
Kurosaki et al.

(10) Patent No.: US 8,804,074 B2
(45) Date of Patent: Aug. 12, 2014

(54) LIQUID CRYSTAL DISPLAY DEVICE

(75) Inventors: Yoshihisa Kurosaki, Kawasaki (JP);
Toshiaki Yoshihara, Kawasaki (JP);
Takuto Kato, Seto (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 13/309,064

(22) Filed: Dec. 1, 2011

(65) Prior Publication Data
US 2012/0092600 A1 Apr. 19, 2012

Related U.S. Application Data

(63) Continuation of application No. PCT/JP2009/061131, filed on Jun. 18, 2009.

(51) Int. Cl.
*G02F 1/1347* (2006.01)

(52) U.S. Cl.
USPC ............................ 349/78; 349/115

(58) Field of Classification Search
CPC .................................. G02F 1/13478
USPC .................................... 349/78, 115
See application file for complete search history.

(56) References Cited

U.S. PATENT DOCUMENTS

| | | | |
|---|---|---|---|
| 6,646,710 B2* | 11/2003 | Suzuki et al. | 349/172 |
| 6,750,928 B2* | 6/2004 | Hiji et al. | 349/74 |
| 6,852,375 B2* | 2/2005 | Kobayashi et al. | 428/1.3 |
| 7,126,654 B2* | 10/2006 | Funfschilling et al. | 349/80 |
| 7,193,674 B2* | 3/2007 | Hong | 349/141 |

FOREIGN PATENT DOCUMENTS

| | | |
|---|---|---|
| JP | 61-159622 | 7/1986 |
| JP | 7-77699 | 3/1995 |
| JP | 11-64880 | 3/1999 |
| JP | 2001-147444 | 5/2001 |
| JP | 2002-116461 | 4/2002 |
| JP | 2002-287136 | 10/2002 |
| JP | 2003-29301 | 1/2003 |
| JP | 2004-279543 | 10/2004 |

OTHER PUBLICATIONS

International Search Report for PCT/JP2009/061131 mailed Jul. 14, 2009.

* cited by examiner

*Primary Examiner* — James Dudek
(74) *Attorney, Agent, or Firm* — Staas & Halsey LLP

(57) ABSTRACT

A liquid crystal display device including: a liquid crystal display element that includes a liquid crystal layer, and an upper substrate and a lower substrate opposed to each other via the liquid crystal layer, a plurality of liquid crystal display elements being stacked; wherein a condensing direction of a reflected light by directional control in at least one of the liquid crystal display elements is different from a condensing direction of a reflected light by directional control in at least one of another liquid crystal display elements.

9 Claims, 23 Drawing Sheets

PLANAR STATE

PLANAR STATE

FOCAL CONIC STATE

LIQUID CRYSTAL
DISPLAY
ELEMENT10(R)

LIQUID CRYSTAL
DISPLAY
ELEMENT20(L)

Blue(L)

Blue(R)

Green(L)

Green(R)

Red(L)

Red(R)

<COMPARATIVE EXAMPLE 11>

Blue

Green

Red

Blue

Green

Red

<COMPARATIVE EXAMPLE 2>

LIQUID CRYSTAL DISPLAY DEVICE

CROSS-REFERENCE TO RELATED APPLICATION

This application is a continuation application of PCT/JP2009/061131 filed Jun. 18, 2009, the contents of which are herein wholly incorporated by reference.

FIELD

A certain aspect of the present invention is related to a liquid crystal display device.

BACKGROUND

Recently, in each of companies, universities and so on, the development of an electronic paper is actively promoted. Various applied methods of the electronic paper are proposed such as a digital book which is first on the list, a sub-display of a mobile terminal device, a display unit of an IC card. There is a display method using a liquid crystal composition in which a cholesteric phase is formed (cholesteric liquid crystal) as one of the display methods of the electronic paper. The cholesteric liquid crystal is also called a chiral nematic liquid crystal. This cholesteric liquid crystal is a liquid crystal in which molecules of the nematic liquid crystal form a spiral cholesteric phase by adding relatively large amounts (tens of %) of additive agent with chirality (chiral material) to the nematic liquid crystal. The cholesteric liquid crystal has the superior characteristics, such as a characteristic (memory characteristic) of holding a display semipermanently, a vivid color display characteristic, a high contrast characteristic, and a high resolution characteristic.

More specifically, the cholesteric liquid crystal includes bistability (memory characteristic), and enters into any one of a planar state, a focal conic state and a middle state where they are mixed, by the adjustment of an electric field intensity applied to the liquid crystal. Once the cholesteric liquid crystal becomes in the planar state or the focal conic state, the cholesteric liquid crystal is stable under no electric power afterward and maintains the state.

The planar state is acquired by making the electric field into zero rapidly after a given high voltage is impressed and a strong electric field is applied to the liquid crystal. On the contrary, the focal conic state is acquired by making the electric field into zero rapidly after a voltage lower than the above-mentioned given high voltage is impressed and the electric field is applied to the liquid crystal, for example. The middle state where the planar state and the focal conic state are mixed is acquired by making the electric field into zero rapidly after a voltage lower than the voltage for acquiring the focal conic state is impressed and the electric field is applied to the liquid crystal, for example.

When the cholesteric liquid crystal is in the planar state, a light of a wavelength corresponding to a spiral pitch of the liquid crystal molecules is reflected selectively. At this case, the center wavelength λ of the reflected light can be expressed by the product of an average refractive index n of the liquid crystal and a spiral pitch p (n×p). That is, the color display can be achieved by stacking two or more cholesteric liquid crystals, adjusting the value λ of each layer, and setting the reflected light of each layer to red, green and blue. The cholesteric liquid crystal that enables such a color display is disclosed by Japanese Laid-open Patent Publication No. 2002-116461, for example.

On the other hand, when only a single liquid crystal layer is used as the cholesteric liquid crystal, a percentage of the light that can be used for the display among incidence lights which enter into the liquid crystal layer is 50%. This is because the cholesteric liquid crystal has a characteristic to reflect either of a right-handed circularly polarized light component and a left-handed circularly polarized light component among the incidence lights. In order to use both of the right-handed circularly polarized light component and the left-handed circularly polarized light component of the light of the same wavelength for the display, the structure stacking a liquid crystal layer in which the spiral arrangement of the liquid crystal molecules is counterclockwise (hereinafter referred to as "L layer") and a liquid crystal layer in which the spiral arrangement of the liquid crystal molecules is clockwise (hereinafter referred to as "R layer") is disclosed by Japanese Laid-open Patent Publication No. 2003-29301.

SUMMARY

According to an aspect of the present invention, there is provided a liquid crystal display device including: a liquid crystal display element that includes a liquid crystal layer, and an upper substrate and a lower substrate opposed to each other via the liquid crystal layer, a plurality of liquid crystal display elements being stacked; wherein a condensing direction of a reflected light by directional control in at least one of the liquid crystal display elements is different from a condensing direction of a reflected light by directional control in at least one of another liquid crystal display elements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

A detailed description will be given of a liquid crystal display device 100 according to a first embodiment, based on FIGS. 1 to 6.

Figure 1:
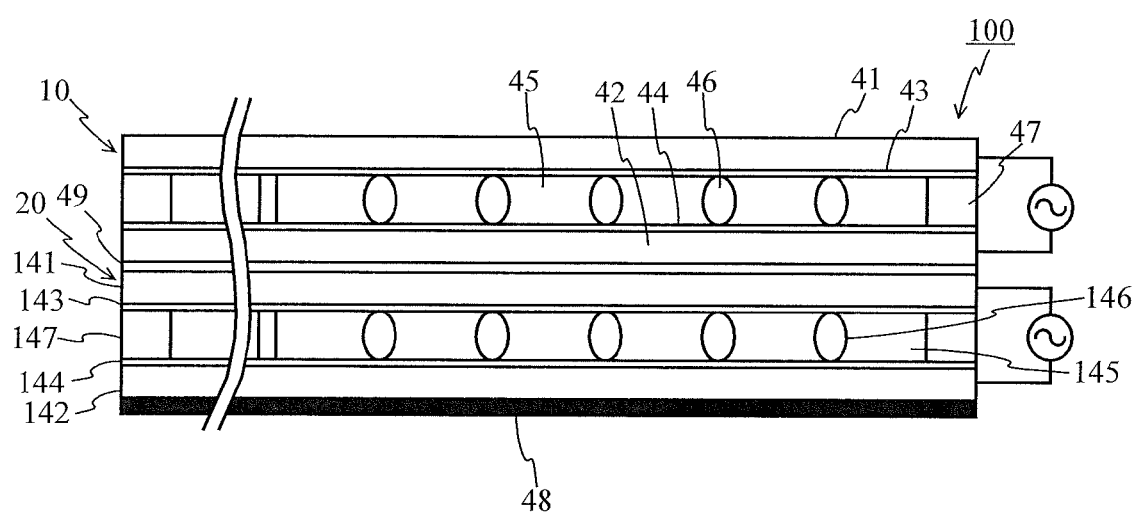
FIG. 1 is a diagram illustrating a schematic configuration of a liquid crystal display device according to a first embodiment.

In FIG. 1, a schematic configuration of the liquid crystal display 100 using a cholesteric liquid crystal which can memory display under no electric power is illustrated. In addition, the liquid crystal display 100 of FIG. 1 stacks liquid crystal display elements 10 and 20 that display a monochrome image (here, it is considered as green), and the optical absorption layer 48, as an example.

The liquid crystal display element 10 includes film substrates 41 and 42, ITO electrodes 43 and 44, a liquid crystal mixture 45, a spacer 46, and a sealing layer 47, as illustrated in FIG. 2.

Both of the film substrates 41 and 42 have translucency. Although a glass substrate can be used as a material of the film substrates 41 and 42, the material of the film substrates 41 and 42 is not limited to this, and a film substrate such as PET (Polyethylene Terephthalate) and PC (Polycarbonate) can also be used, for example.

The ITO electrodes 43 and 44 are two or more belt-like electrodes arranged in parallel. The ITO electrodes 43 and 44 are arranged such that they cross at an angle of 90 degrees mutually, as viewed from a direction perpendicular to the film substrates 41 and 42. The ITO electrodes 43 and 44 corresponding to a number of pixels may be provided. For example, when the liquid crystal display 100 enables QVGA display of 320×240 dots, one of the ITO electrodes 43 and 44 may be prepared by 320 sets and the other of the ITO electrodes 43 and 44 may be prepared by 240 sets. A material of the ITO electrodes 43 and 44 is Indium Tin Oxide (ITO). Instead, electrodes using a transparent conductive film such as Indium Zinc Oxide (IZO) may be adopted.

In addition, insulated thin films are formed on the ITO electrodes 43 and 44. When the insulated thin films are thick, a drive voltage rises and the control with a general-purpose STN driver becomes difficult. On the contrary, when the insulated thin films are not provided, a leakage current flows, and hence power consumption increases. Since a specific inductive capacity of the insulated thin films is around 5 and lower than that of the liquid crystal, it is suitable that the thickness of the insulated thin films is 0.3 lm or less in general. A thin film of $SiO_2$, or an organic film such as a polyimide resin and an acrylic resin well-known as an oriented stabilization film can be used as the insulated thin films.

The liquid crystal mixture 45 is a cholesteric liquid crystal composition indicating a cholesteric phase at room temperature. The liquid crystal mixture 45 can enter into any one of a planar state, a focal conic state and a middle state where they are mixed, by a voltage applied from an external power source via the ITO electrodes 43 and 44. The planar state is acquired by making the electric field into zero rapidly after a given high voltage is impressed and a strong electric field is applied to the liquid crystal. The focal conic state is acquired by making the electric field into zero rapidly after a voltage lower than the above-mentioned given high voltage is impressed and the electric field is applied to the liquid crystal, for example. The middle state where the planar state and the focal conic state are mixed is acquired by making the electric field into zero rapidly after a voltage lower than the voltage for acquiring the focal conic state is impressed and the electric field is applied to the liquid crystal, for example.

It is assumed that the liquid crystal mixture 45 is a cholesteric liquid crystal in which the chiral material is added to a nematic liquid crystal mixture 10-40% by weight. An amount of addition of the chiral material is a value when a total amount of a nematic liquid crystal component and the chiral material is made into 100% by weight. Although a previously known liquid crystal as the nematic liquid crystal can be used, it is desirable that a dielectric anisotropy ($\Delta \in$) is in the range of 15-35. When the dielectric anisotropy is more than 15, the drive voltage becomes relatively low. However, when the dielectric anisotropy exceeds 35, the drive voltage itself is low, a specific resistance becomes small, and hence especially the power consumption at the time of high temperature increases. In addition, it is desirable that a refractive-index anisotropy ($\Delta n$) is about 0.18-0.24. When the refractive-index anisotropy is smaller than this range, the reflectance of the planar state becomes low. When the refractive-index anisotropy is larger than this range, the scatter reflections in the focal conic state becomes large, and hence the viscosity becomes higher and a response speed decreases. Here, it is assumed that the liquid crystal mixture 45 is an R liquid crystal layer in which the liquid crystal molecules are arranged clockwise. In the planar state, the liquid crystal mixture 45 reflects only the right-handed circularly polarized light component in the incident light of a given wavelength zone in which the center wavelength is 550 nm.

The spacer 46 holds uniformly a gap between a pair of film substrates 41 and 42. As the spacer, a sphere made from a resin or an inorganic oxide can be used. Moreover, an adherence spacer in which a thermoplastic resin is coated on the surface can also be used as the spacer. Instead, a photoresist which is patterned through a photolithographic process and calcinated about 120 minutes at 150 degrees can also be used. It is desirable that the gap formed by the spacer is the range of 3-6 lm for example. This is because, when the gap is smaller than this range, the reflectance decreases and the liquid crystal becomes a dark display, and when the gap is larger than this range, the drive voltage rises and the drive by general-purpose parts becomes difficult.

The sealing layer 47 encloses the liquid crystal mixture 45 between the film substrates 41 and 42. An epoxy seal adhesive can be used as the sealing layer 47.

The liquid crystal display element 20 includes film substrates 141 and 142, ITO electrodes 143 and 144, a liquid crystal mixture 145, a spacer 146, and a sealing layer 147, as illustrated in FIG. 2. Here, it is assumed that the liquid crystal mixture 145 is an L liquid crystal layer in which the liquid crystal molecules are arranged counterclockwise. In the planar state, the liquid crystal mixture 145 reflects only the right-handed circularly polarized light component in the incident light of a given wavelength zone in which the center wavelength is 550 nm. The other elements (the film substrates 141 and 142, the ITO electrodes 143 and 144, the liquid crystal mixture 145, the spacer 146, and the sealing layer 147) are similar to respective elements of the above-mentioned liquid crystal display element 10. An interlayer adhesive layer 49 is adhered between the liquid crystal display elements 10 and 20.

The optical absorption layer 48 is disposed on a back side (a lower surface of the sheet of FIG. 1) of the film substrate 142 located on an opposite side (a lower side of the sheet of FIG. 1) to a side (an upper side of the sheet of FIG. 1) into which the light of the liquid crystal display element 20 enters.

Figure 2A:
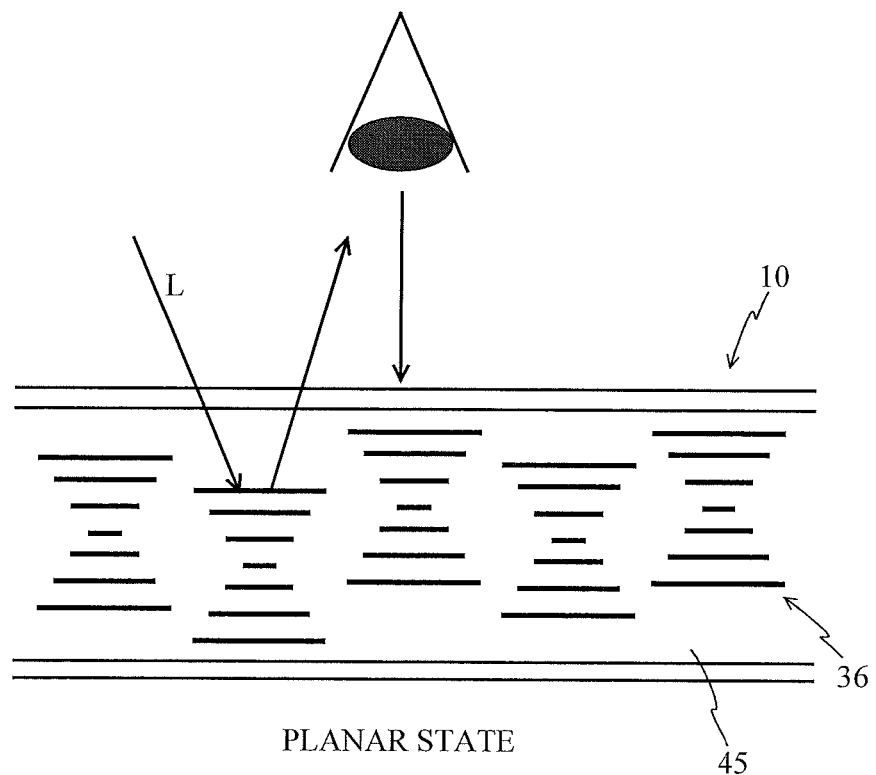
FIGS. 2A and 2B are explanatory diagrams of a display principle of a liquid crystal display element.
Figure 2B:
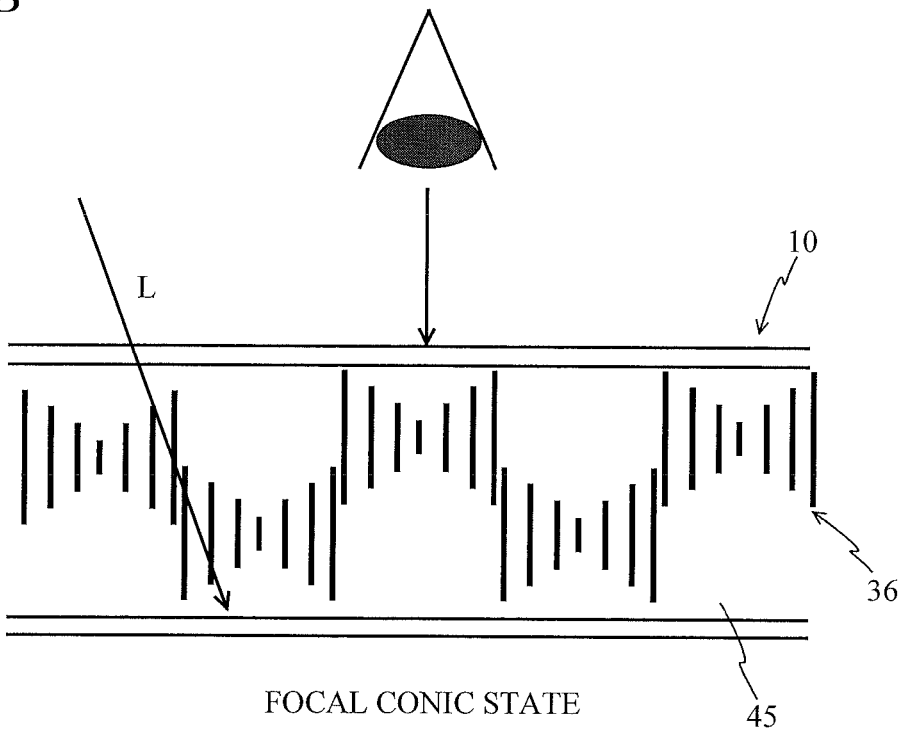

Here, a description will be given of a display principle of the cholesteric liquid crystal based on FIGS. 2A and 2B. FIG. 2A illustrates an oriented state of the liquid crystal molecules 36 when the liquid crystal mixture 45 of the liquid crystal display element 10 is in the planar state. FIG. 2B illustrates an oriented state of the liquid crystal molecules 36 when the liquid crystal mixture 45 of the liquid crystal display element 10 is in the focal conic state.

As illustrated in FIG. 2A, the liquid crystal molecules 36 in the planar state sequentially rotate in a thickness direction and form a spiral structure, and a screw axis of the spiral structure becomes almost perpendicular to a substrate surface. In the planar state, the incidence light L of a given wavelength according to the spiral pitch of the liquid crystal molecules is selectively reflected by the liquid crystal layer. Since the liquid crystal mixture 45 of the liquid crystal display element 10 is the R liquid crystal layer, the liquid crystal mixture 45 reflects only the right-handed circularly polarized light component in the incident light of the given wavelength zone in which the center wavelength is 550 nm.

Here, when the average refractive index of the liquid crystal layer is set to n and the spiral pitch is set to p, the wavelength λ in which the reflection is maximum can be expressed by the product of n and p. In order to selectively reflect the light (the light of the given wavelength zone in which the center wavelength is 550 nm) in the planar state with the liquid crystal mixture 45 of the liquid crystal display element 10, the average refractive index n and the spiral pitch p may be decided so that the λ becomes a wavelength of 550 nm. The average refractive index n can be adjusted by selecting the liquid crystal material and the chiral material, and the spiral pitch p can adjust by adjusting a rate of content of the chiral material.

On the contrary, as illustrated in FIG. 2B, the liquid crystal molecules 36 in the focal conic state sequentially rotate in a direction of the inside of the substrate surface and form a spiral structure, and a screw axis of the spiral structure becomes almost parallel to the substrate surface. In this case, the liquid crystal display element 10 loses the selectivity of a reflective wavelength, and makes most of the incidence light L penetrate.

Thus, in the cholesteric liquid crystal, the reflection and the penetration of the incidence light L can be controlled by the oriented state of the liquid crystal molecules 36 that is twisted spirally. Moreover, the incidence light L that has penetrated the liquid crystal display element 10 enters into the liquid crystal display element 20.

When the liquid crystal mixture 145 of the liquid crystal display element 20 is in the planar state, the light is reflected with the liquid crystal mixture 145 as is the case with FIG. 2A. Here, since the liquid crystal mixture 145 of the liquid crystal display element 20 is the L liquid crystal layer, only the left-handed circularly polarized light component of the given wavelength zone in which the center wavelength is 550 nm is reflected. When the liquid crystal mixture 145 is in the focal conic state, the incidence light penetrates the liquid crystal mixture 145 as is the case with FIG. 2B. Since the light that has penetrated the liquid crystal mixture 145 is absorbed with the optical absorption layer 48 illustrated in FIG. 1, a dark display can be achieved.

Figure 3A:
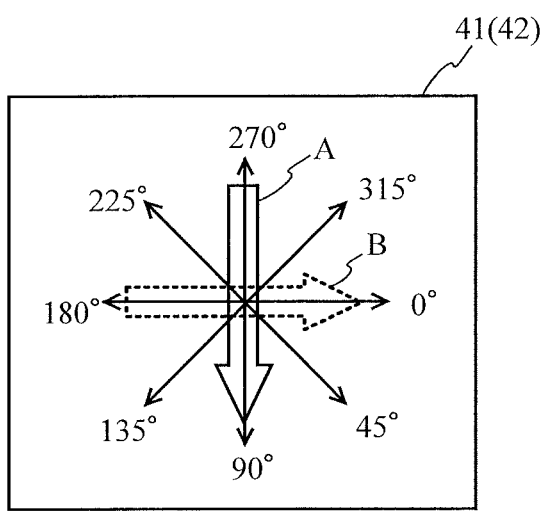
FIG. 3A is a diagram illustrating directions of a rubbing process of film substrates 41 and 42.

Here, in the present embodiment, a rubbing process in a direction of an arrow A illustrated in FIG. 3A is performed on the upper film substrate 41 of the liquid crystal display element 10, and a rubbing process in a direction of an arrow B is performed on the lower film substrate 42. The direction of the arrow A differs from that of the arrow B by 90 degrees, as illustrated in FIG. 3A.

Figure 4A:
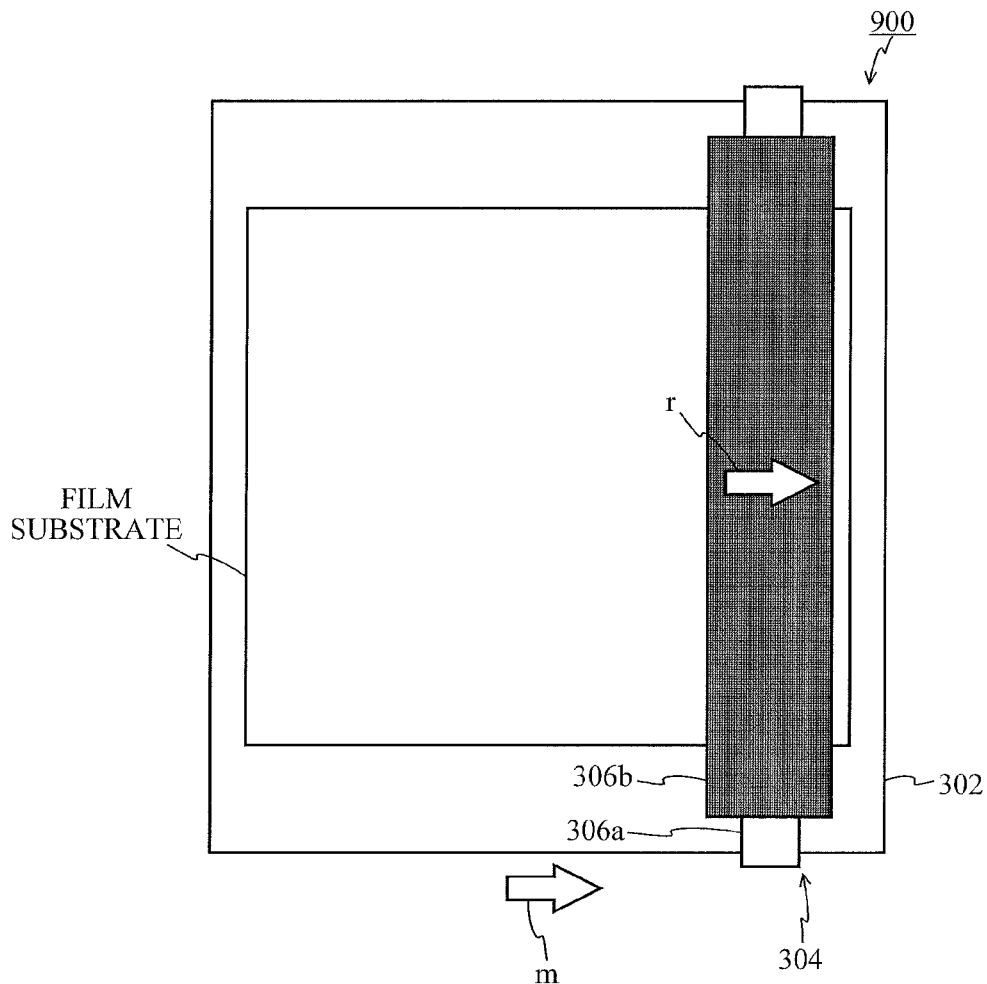
FIG. 4A is a plan view of a rubbing process device.
Figure 4B:
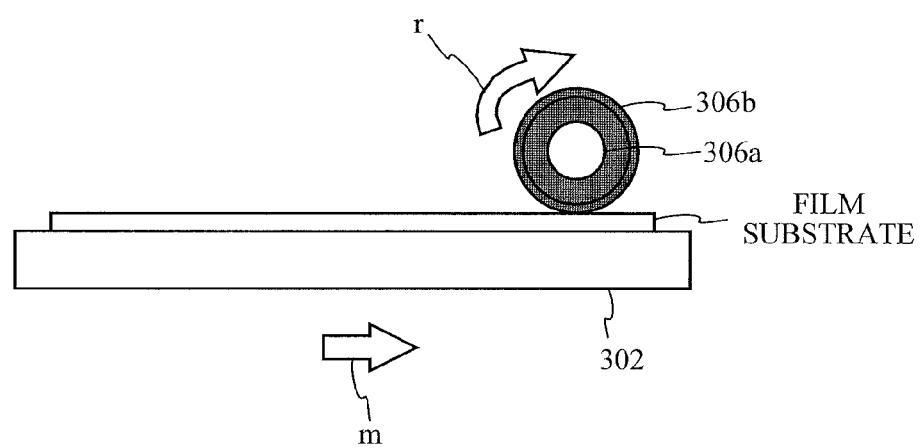
FIG. 4B is a front view of the rubbing process device.

The rubbing processes to the film substrates 41 and 42 are performed with a rubbing process device 900, as illustrated in FIG. 4. The rubbing process device 900 includes an adsorption stage 302, and a rubbing roller 304 that is disposed above the adsorption stage 302 and rotatable in a direction of an arrow r of FIG. 4B, as illustrated in a plan view of FIG. 4A and a front view of FIG. 4B.

The adsorption stage 302 adsorbs and holds the film substrates 41 and 42 by vacuum adsorption, electrostatic adsorption, or the like, and can move in a direction of an arrow m. The rubbing roller 304 includes a shaft unit 306a and a rubbing cloth (buff) 306b wound around the shaft unit 306a. For example, a rayon cloth can be used as the rubbing cloth 306b.

In the rubbing process device 900, the rubbing roller 304 (rubbing cloth 306b) is contacted on the surface of each of the film substrates 41 and 42 adsorbed and held on the adsorption stage 302. Then, the rubbing process to the surface of each of the film substrates 41 and 42 can be performed by rotating the rubbing roller 304 in the direction of the arrow r, and simultaneously moving the adsorption stage 302 in the direction of the arrow m. It is possible to change the rubbing directions by mutually changing installation directions on the adsorption stage 302 of the film substrates 41 and 42 on the occasion of the rubbing process to each of the film substrates.

Figure 3B:
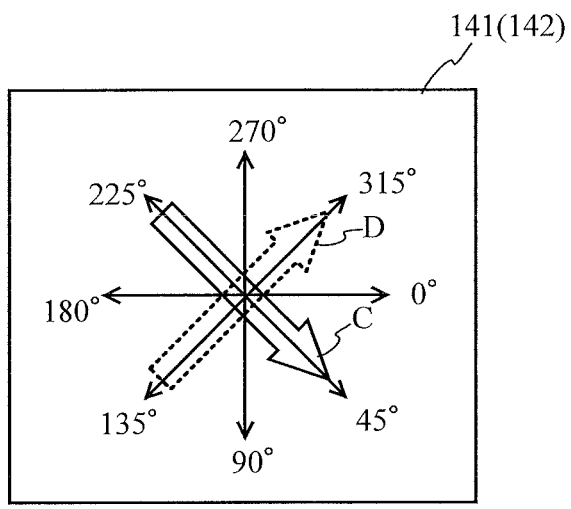
FIG. 3B is a diagram illustrating directions of the rubbing process of film substrates 141 and 142.

Similarly, the rubbing process in a direction of an arrow C is performed on the upper film substrate 141 of the liquid crystal display element 20, and the rubbing process in a direction of an arrow D is performed on the lower film substrate 142, as illustrated in FIG. 3B. The direction of the arrow C differs from that of the arrow D by 90 degrees. The directions of the arrows A and B differ from those of the arrows C and D by 45 degrees, respectively. That is, the directions of the arrows A, B, C, and D are mutually shifted by 45 degrees.

Figure 5A:
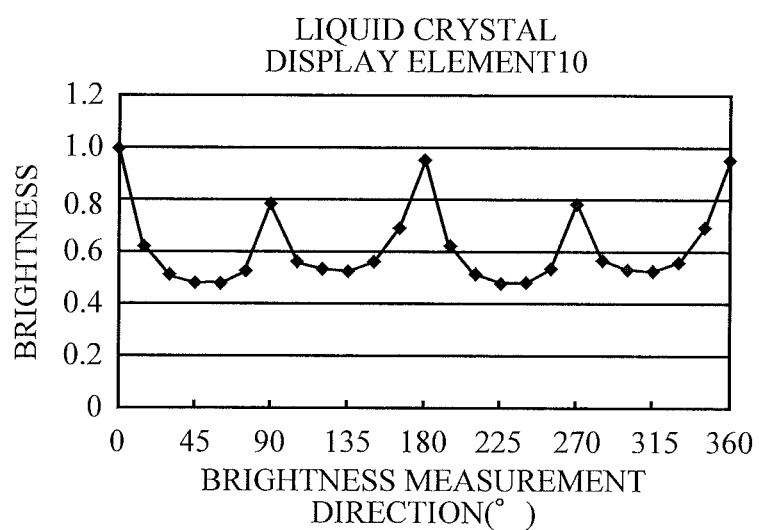
FIG. 5A is a graph illustrating the brightness of the display for each observation angle of a liquid crystal display element 10.
Figure 5B:
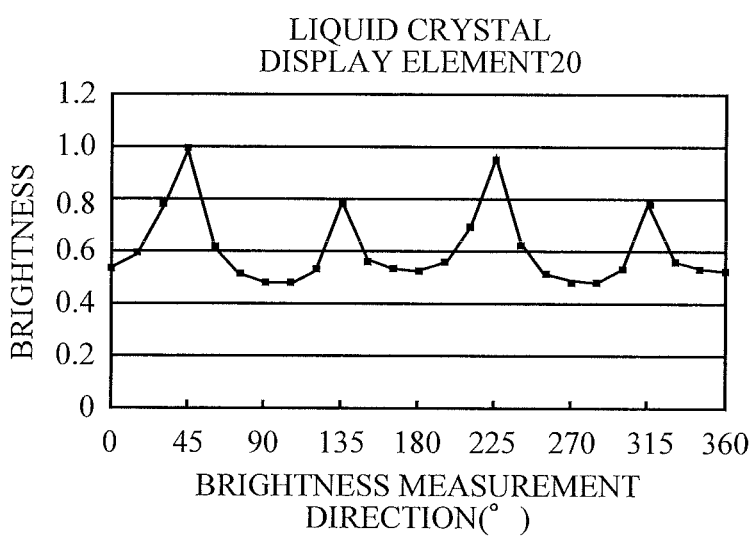
FIG. 5B is a graph illustrating the brightness of the display for each observation angle of a liquid crystal display element 20.

FIGS. 5A and 5B are graphs illustrating whether peaks arise in the brightness of the display when the angle of the observation direction (brightness measurement direction) to an incidence direction of the incidence light is which angle in the liquid crystal display elements 10 and 20 of the planar state. As illustrated in FIG. 5A, in the liquid crystal display element 10 (planar state), the peaks of brightness arise at 0 (360), 90, 180, and 270 degrees of the brightness measurement direction by performing the rubbing process on the film substrates 41 and 42. This is because, when the rubbing process is performed, the reflectance (brightness) in a direction perpendicular to the rubbing direction can be improved. Here, the reflected light in the liquid crystal display element 10 is the right-handed circularly polarized light component in the incident light of the given wavelength zone in which the center wavelength is 550 nm.

On the contrary, as illustrated in FIG. 5B, in the liquid crystal display element 20 (planar state), the peaks of brightness arise at 45, 135, 225, and 315 degrees of the brightness measurement direction. Here, the reflected light in the liquid crystal display element 20 is the left-handed circularly polarized light component in the incident light of the given wavelength zone in which the center wavelength is 550 nm.

Figure 6:
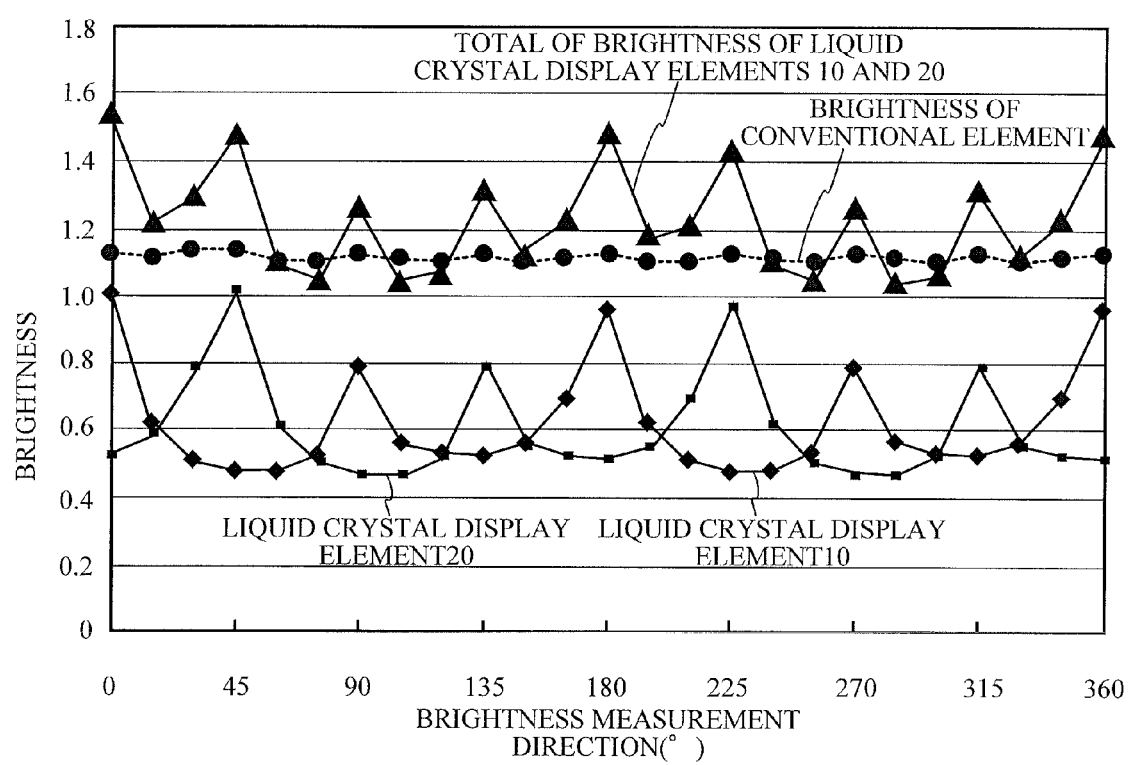
FIG. 6 is a graph illustrating a total of the brightness of the liquid crystal display elements 10 and 20, and the brightness of a conventional liquid crystal display device.

Therefore, such liquid crystal display elements 10 and 20 are stacked, so that a part where the peak of the brightness does not arise in the right-handed circularly polarized light component reflected with the liquid crystal display element 10 can be interpolated by the left-handed circularly polarized light component reflected with the liquid crystal display element 20. Specifically, when the brightness of the liquid crystal display element 10 and the brightness of the liquid crystal display element 20 in the present embodiment are totaled, a waveform is formed as illustrated in FIG. 6. It can be seen that the brightness of the liquid crystal display 100 of the present embodiment becomes bright averagely as illustrated in FIG. 6, as compared with the liquid crystal display that does not perform the rubbing process. That is, even when the liquid crystal display 100 of the present embodiment is seen from every angle to the incidence direction of the incidence light, the display brighter than the conventional display can be achieved.

Moreover, in the present embodiment, in order to make efficient use of the improved brightness as mentioned above, it is desirable to perform the same control on the pixels to which the upper liquid crystal display element 10 and the lower liquid crystal display element 20 correspond. That is, when a specific pixel of the upper liquid crystal display element 10 is set to the planar state, it is desirable to perform control so as to set a pixel corresponding to the above-mentioned specific pixel of the lower liquid crystal display element 20 to the planar state. In addition, when a specific pixel of the upper liquid crystal display element 10 is set to the focal conic state, it is desirable to perform control so as to set a pixel corresponding to the above-mentioned specific pixel of the lower liquid crystal display element 20 to the focal conic state.

As described above, according to the first embodiment, a condensing direction of the reflected light by the rubbing process of one of the liquid crystal display elements 10 and 20 of two layers is different from that of the reflected light by the rubbing process of another one of the liquid crystal display elements 10 and 20. Therefore, the part in one of the liquid crystal display elements whose brightness does not improve by the rubbing process can be interpolated with another one of the liquid crystal display elements. Such a configuration can achieve the liquid crystal display having a high characteristic value, as compared with a case where the structure that the L layer and the R layer are simply stacked is adopted as in the past.

In the first embodiment, since the optical rotation of the liquid crystal display elements in which the condensing directions of the reflected light by the rubbing process differ from each other is mutually changed, the part with little brightness of one of the liquid crystal display elements can be interpolated with another one of the liquid crystal display elements.

In the first embodiment, since the cholesteric liquid crystal layer in which a dominant wavelength of selective reflection is a visible light domain is used as the liquid crystal layer, the power consumption can be reduced by the memory characteristic of the display.

In the first embodiment, since the angle between the directions of the arrows A and B of FIG. 3A is 90 degrees and the angle between the direction of the arrow A or B, and the direction of the arrow C or D is 45 degrees, the direction of A, the direction of C, the direction of B, and the direction of D can be set to regular intervals. Thereby, the deviation of the brightness by the observation direction can be reduced, and balanced brightness can be obtained.

Figure 7A:
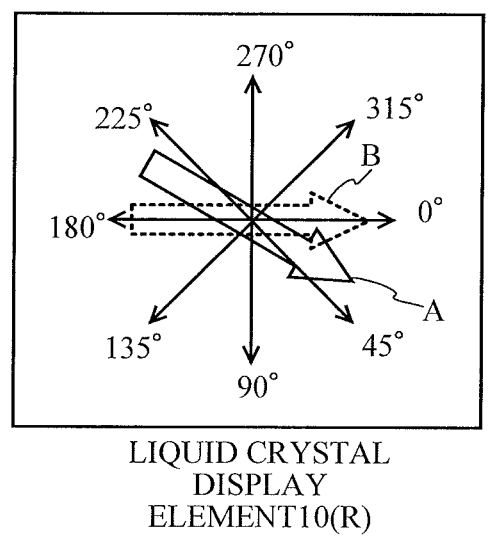
FIGS. 7A and 7B are diagrams illustrating directions of the rubbing process according to a variation example of the first embodiment.
Figure 7B:
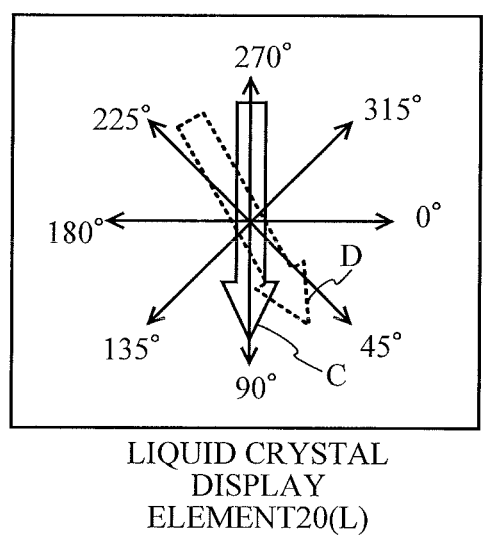
Figure 8A:
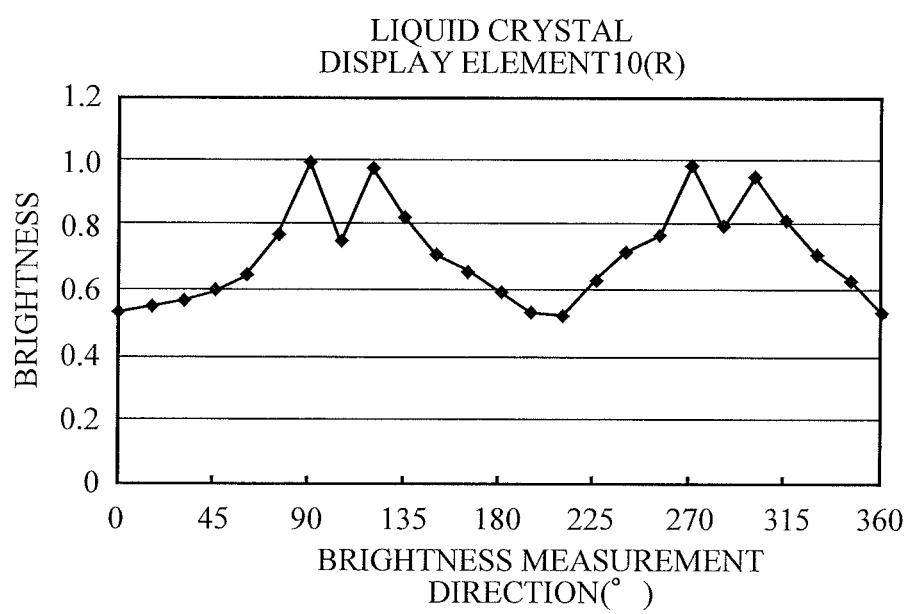
FIGS. 8A and 8B are graphs illustrating the brightness of the display for each observation angle of the liquid crystal display element according to the variation example of the first embodiment.
Figure 8B:
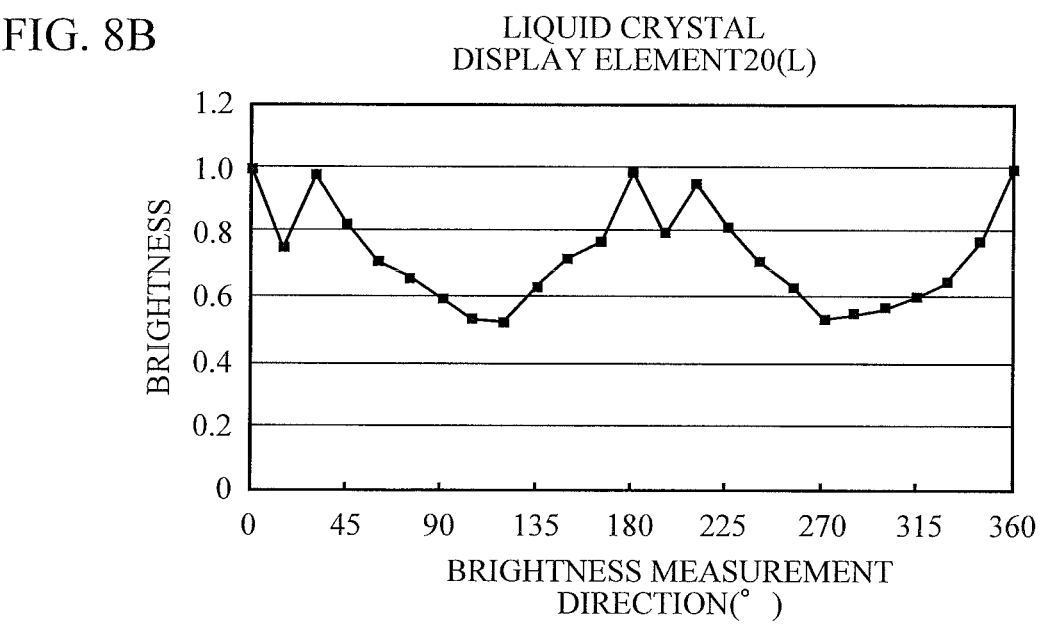
Figure 9:
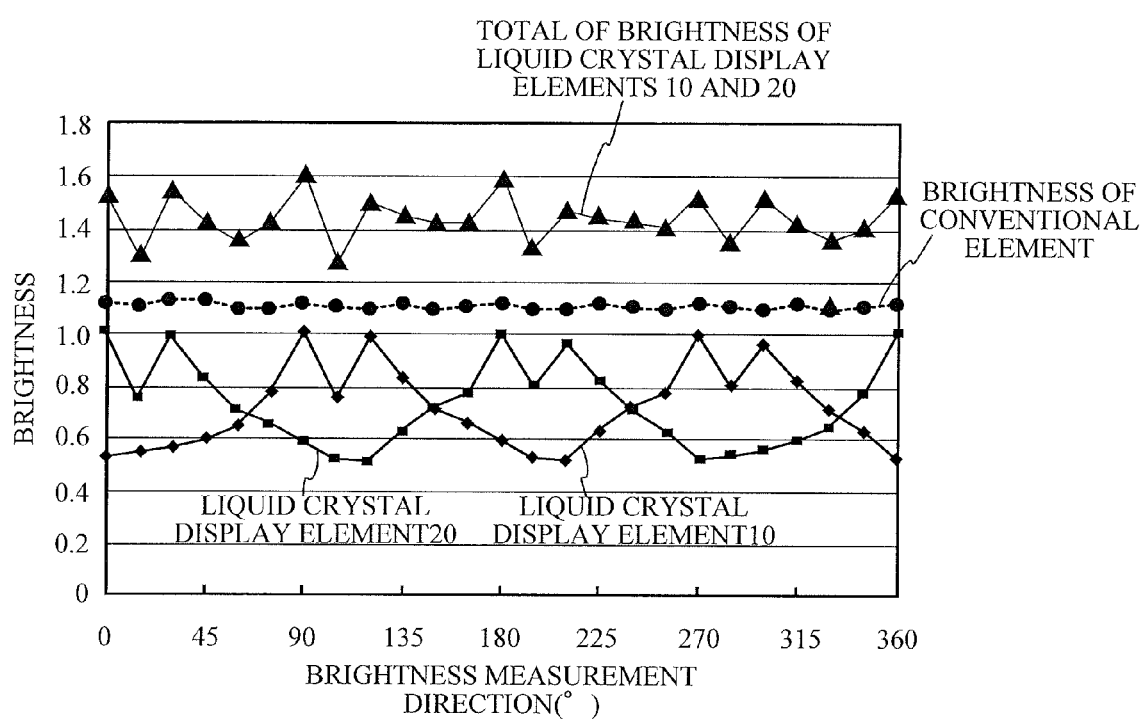
FIG. 9 is a graph illustrating a total of the brightness of the liquid crystal display elements 10 and 20 according to the variation example of the first embodiment, and the brightness of the conventional liquid crystal display device.

In addition, the first embodiment has explained the case where the angle between the directions of the arrows A and B of FIG. 3A is 90 degrees and the angle between the direction of the arrow A or B, and the direction of the arrow C or D is 45 degrees, but the angles are not limited to these. For example, in the case of 30 degrees, the directions of the arrows A and B in the film substrates of the liquid crystal display element 10 are set so as to be different from each other by 30 degrees, as illustrated in FIG. 7A. The directions of the arrows C and D in the film substrates of the liquid crystal display element 20 are set so as to be different from each other by 30 degrees, as illustrated in FIG. 7B. In addition, the directions of the arrows A and D are set so as to be different from each other by 30 degrees. Thereby, in a side of the liquid crystal display element 10, the peaks of brightness appear in the angles of 90 degrees, 120 degrees, 270 degrees, and 300 degrees, as illustrated FIG. 8A. On the contrary, in a side of the liquid crystal display element 20, the peaks of brightness appear in the angles of 0 (360) degrees, 30 degrees, 180 degrees, and 210 degrees, as illustrated FIG. 8B. Thereby, the peaks of the brightness when the liquid crystal display elements 10 and 20 are stacked are illustrated in FIG. 9. When the rubbing directions are also set so as to be different from each other by 30 degrees as illustrated in FIG. 9, the liquid crystal display having a high characteristic value can be achieved as compared with the conventional liquid crystal display as is the case with the above-mentioned first embodiment.

Second Embodiment

Figure 10:
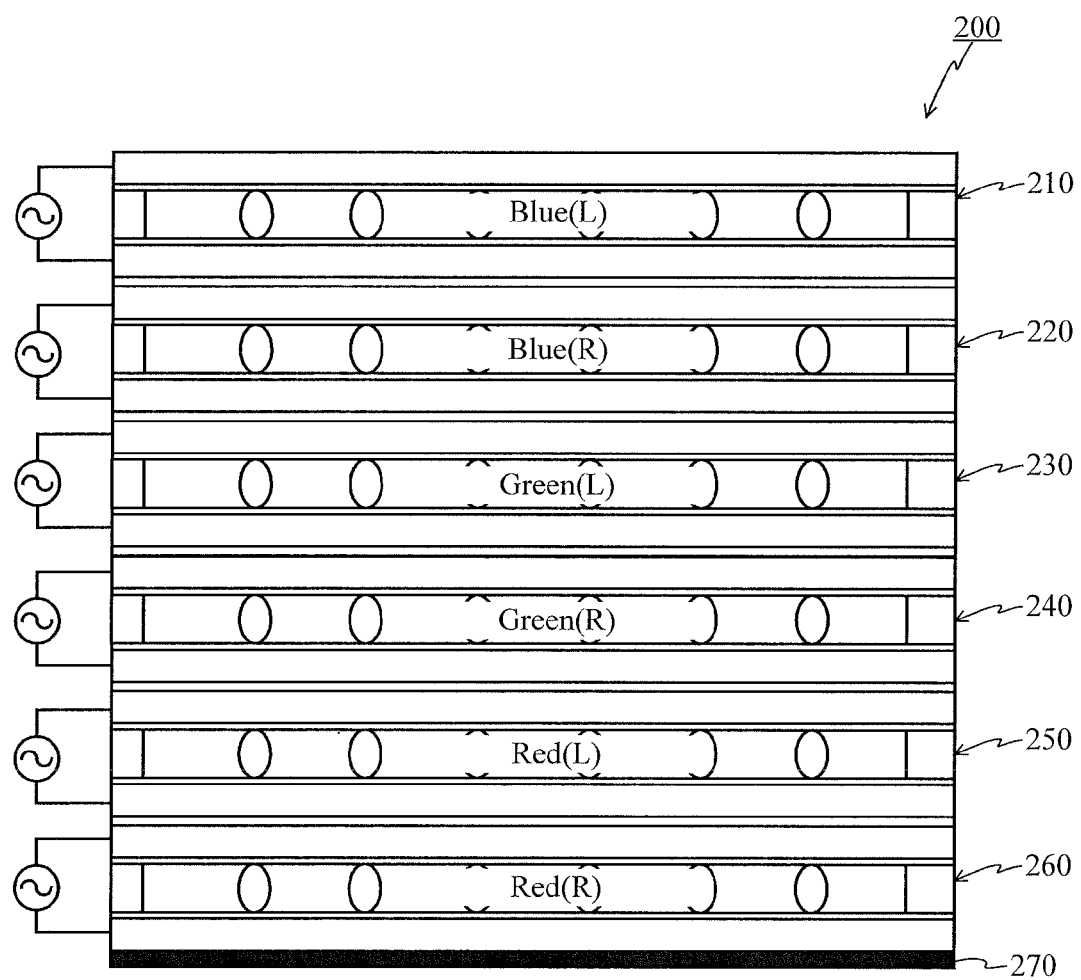
FIG. 10 is a diagram illustrating a schematic configuration of the liquid crystal display device according to a second embodiment.

Next, a description will be given of a second embodiment, based on FIGS. 10 and 11. A liquid crystal display device 200 of the second embodiment is a liquid crystal display device for color display.

The liquid crystal display device 200 includes liquid crystal display elements 210, 220, 230, 240, 250 and 260 of six layers, and an optical absorption layer 270. Each of the liquid crystal display elements is the same as the first embodiment. The respective liquid crystal display elements can reflect the lights of the wavelength zones of blue, blue, green, green, red, and red sequentially from a top in the planar state by changing the average refractive index n of the liquid crystal mixture or the spiral pitch p. Here, in the liquid crystal display elements of two layers displaying the same color, an upper part thereof is the L layer and reflects the left-handed circularly polarized light component, and a lower part thereof is the R layer and reflects the right-handed circularly polarized light component. That is, the liquid crystal display element 210 reflects the blue light (L), the liquid crystal display element 220 reflects the blue light (R), the liquid crystal display element 230 reflects the green light (L), the liquid crystal display element 240 reflects the green light (R), the liquid crystal display element 250 reflects the red light (L), and the liquid crystal display element 260 reflects the red light (R).

Figure 11A:
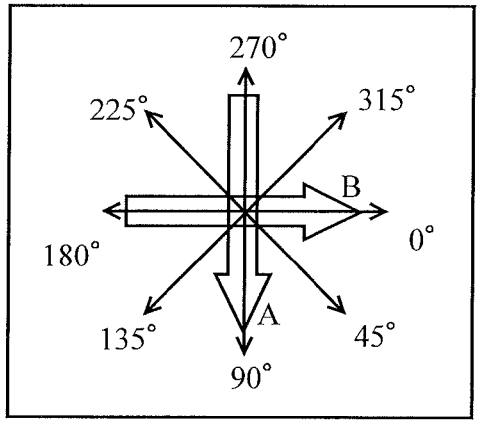
FIGS. 11A to 11F are diagrams illustrating directions of the rubbing process of the liquid crystal display device of FIG. 10.
Figure 11B:
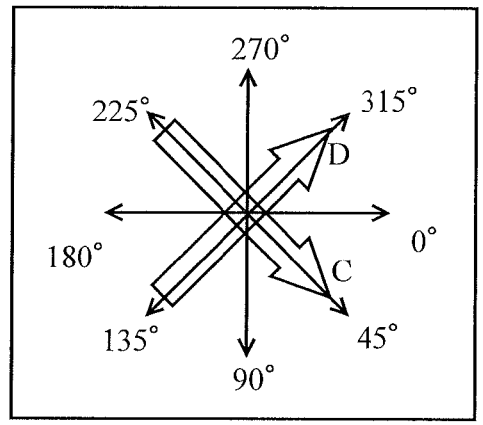
Figure 11C:
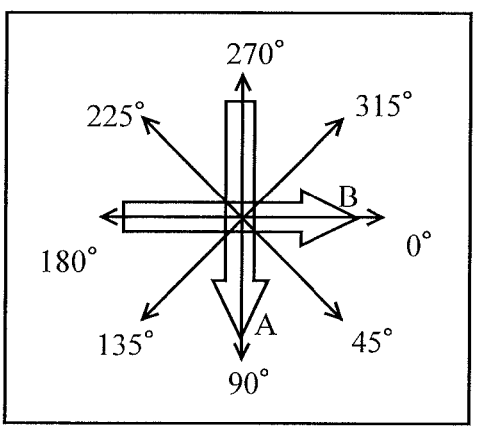
Figure 11D:
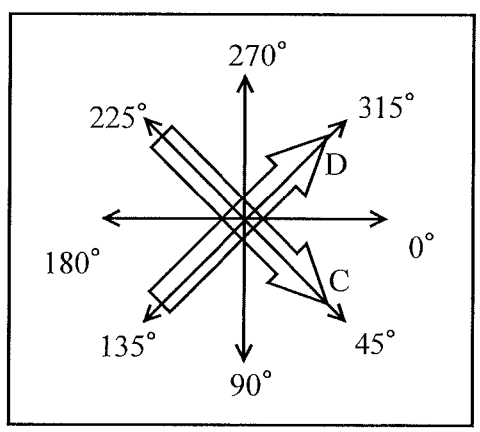
Figure 11E:
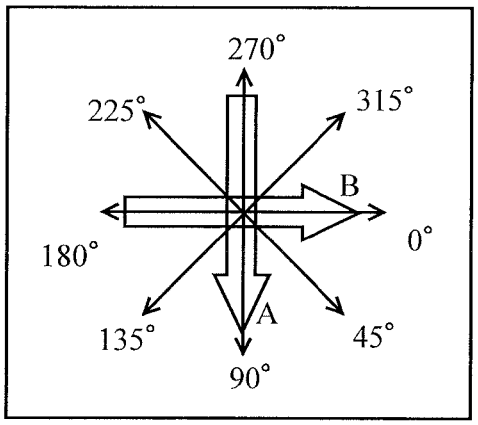
Figure 11F:
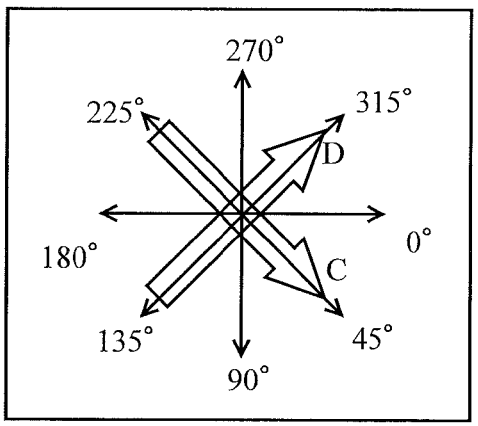

Here, it is assumed that, in the liquid crystal display element 210, the rubbing directions of two film substrates are a direction of an arrow A and a direction of an arrow B shifted from the direction of the arrow A by 90 degrees, as illustrated in FIG. 11A. In addition, it is assumed that, in the liquid crystal display element 220, the rubbing directions of two film substrates are a direction of an arrow C and a direction of an arrow D shifted from the direction of the arrow C by 90 degrees, as illustrated in FIG. 11B. The directions of the arrows A and C are shifted by 45 degrees, and the directions of the arrows B and D are shifted by 45 degrees. That is, the directions of the arrows A, B, C, and D are mutually shifted by 45 degrees. Similarly, it is assumed that, in the liquid crystal display elements 230 and 250, the rubbing directions of two film substrates are a direction of an arrow A and a direction of an arrow B, as illustrated in FIGS. 11C and 11E. It is assumed that, in the liquid crystal display elements 240 and 260, the rubbing directions of two film substrates are a direction of an arrow C and a direction of an arrow D, as illustrated in FIGS. 11D and 11F.

Thus, in each of the liquid crystal display elements, the rubbing directions are set so as to be different from each other, so that the same effects as the above-mentioned first embodiment can be obtained for every same color. That is, in the liquid crystal display device in which the color display is possible, the bright display is enabled in all the colors of blue, green, and red.

In addition, the second embodiment has explained the case where the rubbing directions of the single liquid crystal display element are set so as to be different from each other by 90 degrees, and the rubbing directions of the same-color liquid crystal display elements that are adjacent up and down are set so as to be different from each other by 45 degrees as is the case with the first embodiment. However, the rubbing directions are not limited to these, and each of the rubbing directions may intersect. That is, the rubbing directions may be set so as to be different from each other by another angle (e.g. 30 degrees etc. (see FIG. 7)).

In addition, the second embodiment has explained the case where the rubbing processes are performed on all the film substrates of the liquid crystal display elements of six layers, but the rubbing process is not limited to this. For example, the rubbing process may be performed on at least one of the six layers. Specifically, the rubbing process may be performed on only a blue liquid crystal display element with a low visibility among blue, red, and green.

Third Embodiment

Next, a description will be given of a liquid crystal display device 300 of a third embodiment, based on FIGS. 12 and 13.

Figure 12A:
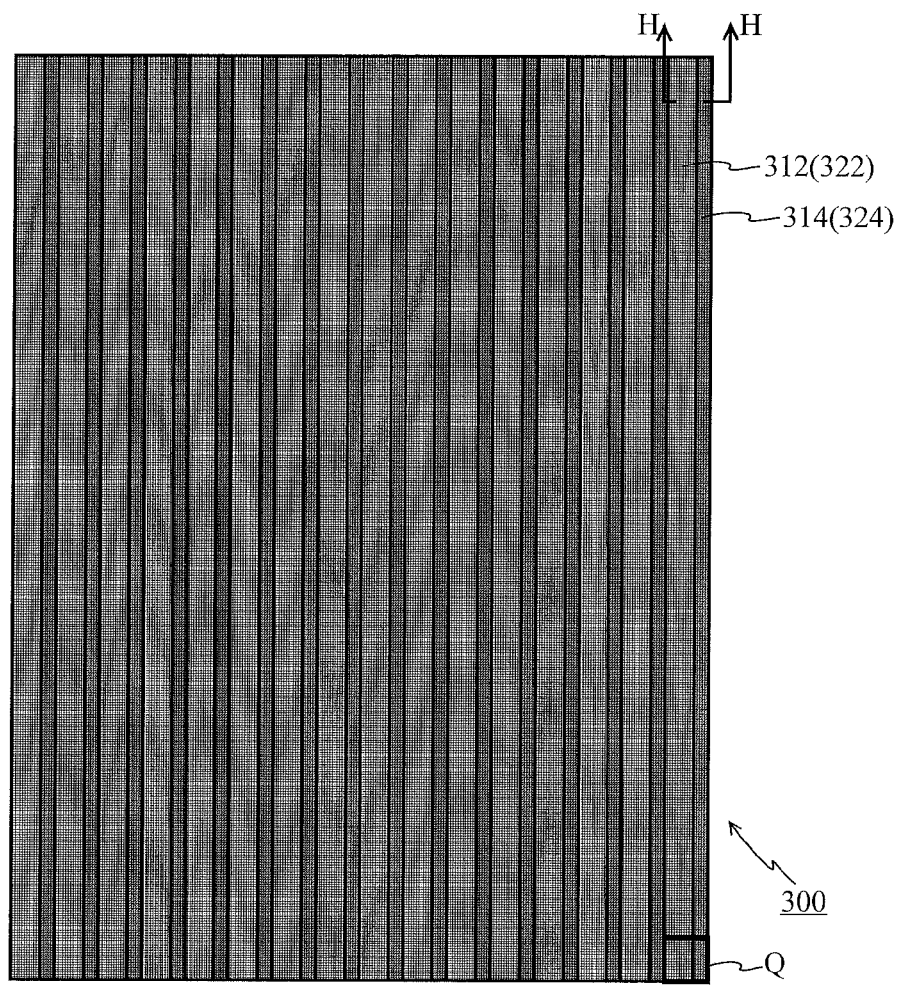
FIG. 12A is a plan view of the liquid crystal display device according to a third embodiment.
Figure 12B:
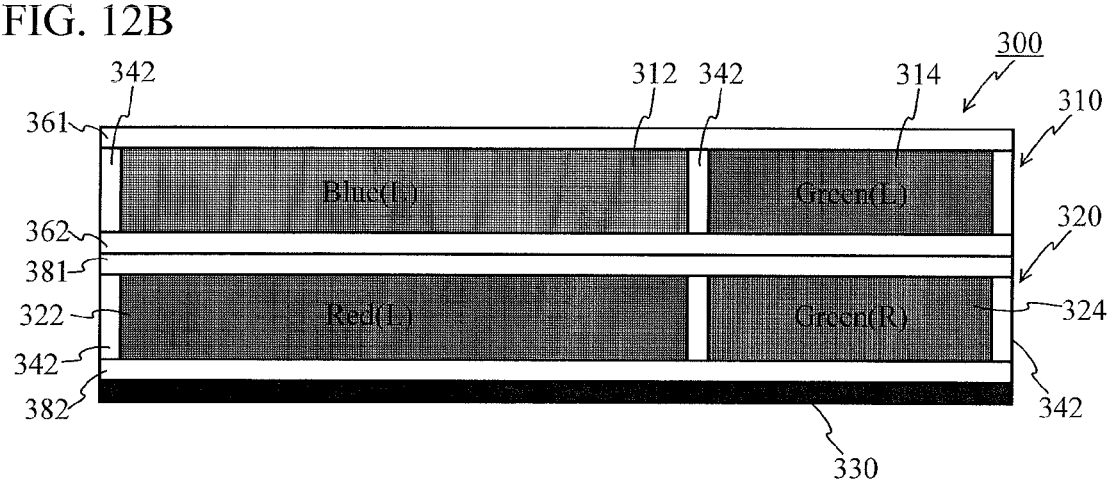
FIG. 12B is a cross sectional diagram of a line H-H in FIG. 12A.

A schematic plan view of the liquid crystal display device 300 according to the third embodiment is illustrated in FIG. 12A, and a cross sectional diagram of a line H-H in FIG. 12A is illustrated in FIG. 12B. As illustrated in these figures, the liquid crystal display device 300 includes liquid crystal display elements 310 and 320 of two layers, and an optical absorption layer 330.

The lower liquid crystal display element 320 includes: two film substrates 381 and 382; a liquid crystal mixture 322 (a red liquid crystal portion) that reflects a red light; and a liquid crystal mixture 324 (a first green liquid crystal portion) that reflects a green light. A division wall 342 is provided between the respective liquid crystal portions. An area ratio (area ratio in FIG. 12A) when the red liquid crystal portion 322 and the first green liquid crystal portion 324 are seen from above is set to 2:1. The red liquid crystal portion 322 and the first green liquid crystal portion 324 are arranged by turns in a lateral direction, as illustrated in FIG. 12A. In addition, a square area Q surrounded by a thick frame in FIG. 12A constitutes 1 pixel.

The upper liquid crystal display element 310 includes: two film substrates 361 and 362; a liquid crystal mixture 312 (a blue liquid crystal portion) that reflects a blue light; and a liquid crystal mixture 314 (a second green liquid crystal portion) that reflects a green light. The blue liquid crystal portion 312 corresponds to the red liquid crystal portion 322, and the second green liquid crystal portion 314 corresponds to the first green liquid crystal portion 324. The division wall 342 is provided between the respective liquid crystal portions. An area ratio (area ratio in FIG. 12A) when the blue liquid crystal portion 312 and the second green liquid crystal portion 314 are seen from above is set to 2:1. The blue liquid crystal portion 312 and the second green liquid crystal portion 314 are also arranged by turns in the lateral direction, as illustrated in FIG. 12A.

The first green liquid crystal portion 324 and the second green liquid crystal portion 314 in these elements have different optical rotations. Here, the first green liquid crystal portion 324 is the R layer that reflects the right-handed circularly polarized light component, and the second green liquid crystal portion 314 is the L layer that reflects the left-handed circularly polarized light component. On the contrary, the blue liquid crystal portion 312 and the red liquid crystal portion 322 have the same optical rotation. Here, by way of example, both of the liquid crystal portions 312 and 322 are the L layers.

Figure 13A:
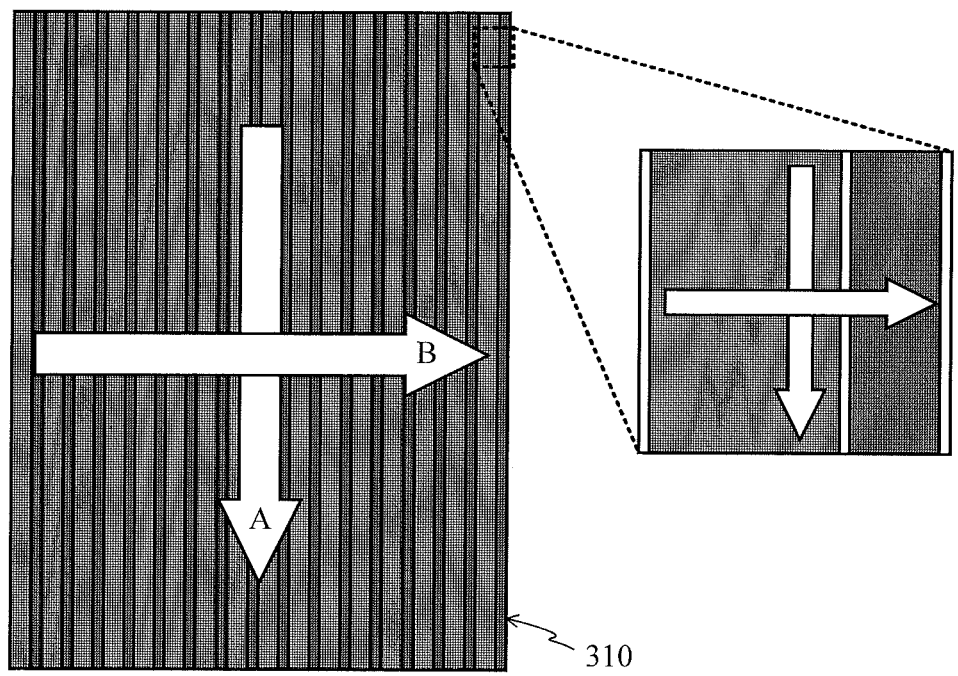
FIGS. 13A and 13B are diagrams illustrating directions of the rubbing process of the liquid crystal display device of FIG. 12.
Figure 13B:
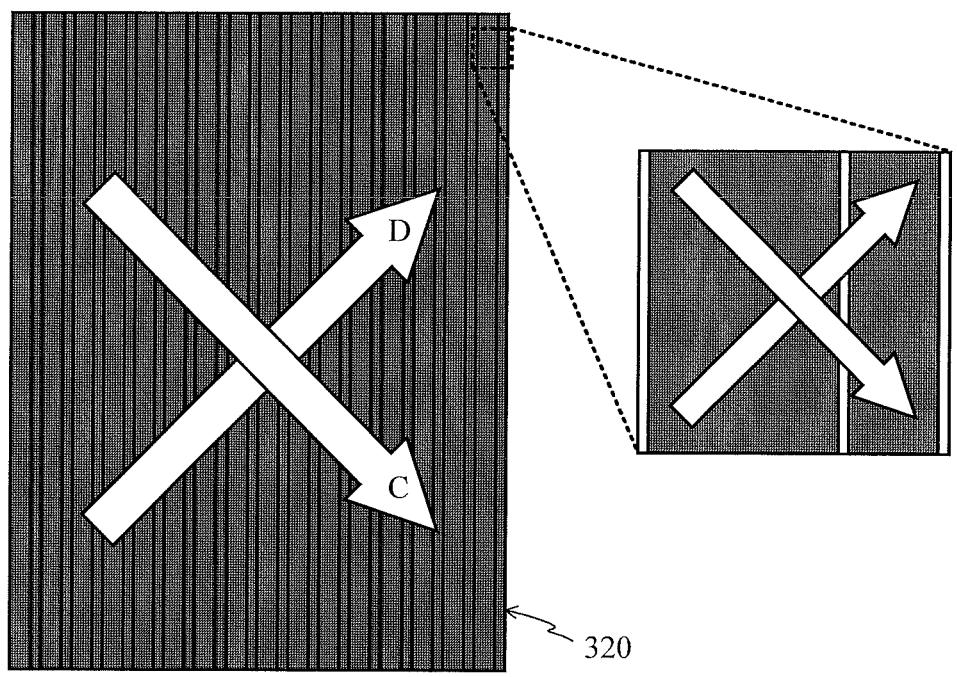

A direction of the rubbing process of the film substrate 361 of the liquid crystal display element 310 is set in an direction of an arrow A, as illustrated in FIG. 13A, and a direction of the rubbing process of the film substrate 362 is set in a direction of an arrow B shifted from the direction of the arrow A by 90 degrees. Moreover, a direction of the rubbing process of the film substrate 381 of the liquid crystal display element 320 is set in an direction of an arrow C, as illustrated in FIG. 13B, and a direction of the rubbing process of the film substrate 382 is set in a direction of an arrow D shifted from the direction of the arrow C by 90 degrees. In addition, the directions of the arrows A and C, and the directions of the arrows B and D are shifted by 45 degrees as is the case with the first and the second embodiments.

In the third embodiment, the same display brightness as the first embodiment can be obtained by the first green liquid crystal portion 324 and the second green liquid crystal portion 314. Moreover, since the area of the blue or red liquid crystal portion 312 or 322 is twice the first green liquid crystal portions 324 or 314, the display brightness of the same level as green can be obtained even when the blue or red liquid crystal portion 312 or 322 is only a single layer.

Although in the above-mentioned third embodiment, the liquid crystal display element 320 is arranged to the upper side and the liquid crystal display element 310 is arranged to the lower side, the third embodiment is not limited to this. The liquid crystal display element 310 may be arranged to the upper side, and the liquid crystal display element 320 may be arranged to the lower side. If the respective directions with respect to the rubbing directions intersect, the angle between the respective directions is arbitrary as is the case with the first and the second embodiments. Moreover, although the above description has explained that the case where the blue and the red liquid crystal portions 312 and 322 are the L layers, the blue and the red liquid crystal portions are not limited to these, and may be the R layers.

Fourth Embodiment

Next, a description will be given of a liquid crystal display device 400 of a fourth embodiment, based on FIGS. 14 to 19.

Figure 14:
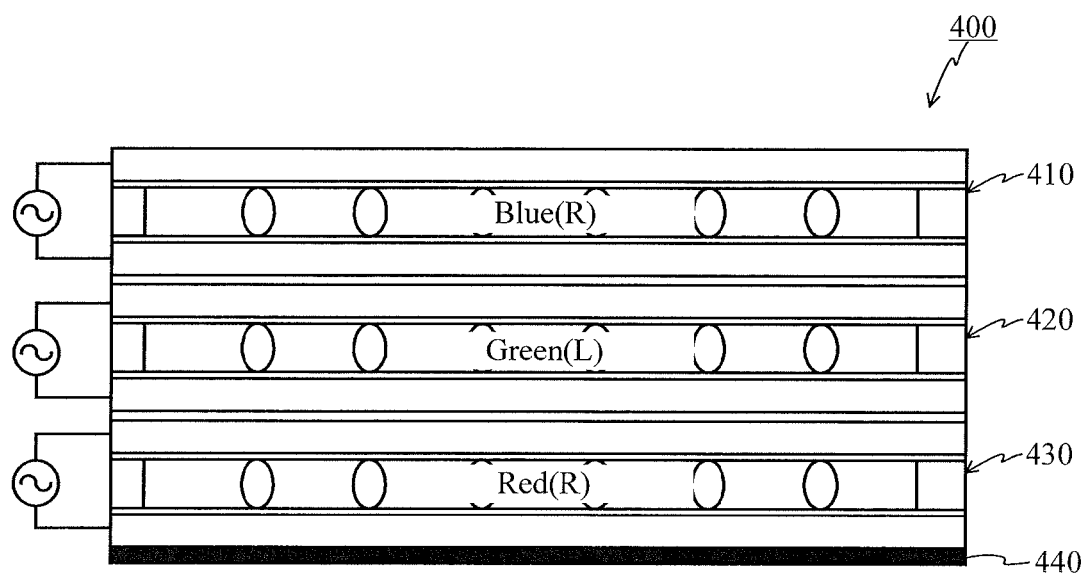
FIG. 14 is a diagram illustrating a schematic configuration of the liquid crystal display device according to a fourth embodiment.
Figure 15A:
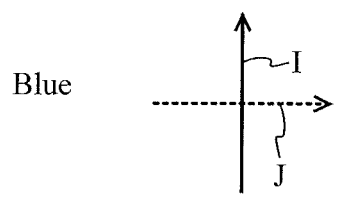
FIGS. 15A to 15C are diagrams illustrating directions of the rubbing process of the liquid crystal display device of FIG. 14.
Figure 15B:
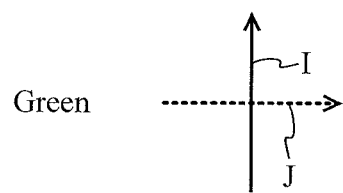
Figure 15C:
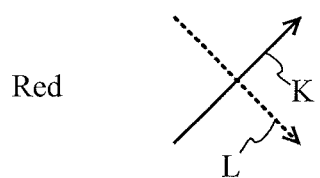

The liquid crystal display device 400 is schematically illustrated in FIG. 14. As illustrated in FIG. 14, the liquid crystal display device 400 includes a blue liquid crystal display element 410, a green liquid crystal display element 420, a red liquid crystal display element 430, and an optical absorption layer 440.

The liquid crystal mixture of the blue liquid crystal display element 410 is the R layer. The rubbing direction of an upper film substrate of the blue liquid crystal display element 410 is set to the direction of an arrow I of FIG. 15A, and the rubbing direction of a lower film substrate is set to the direction of an arrow J shifted from the direction of the arrow I by 90 degrees. In addition, the liquid crystal mixture of the green liquid crystal display element 420 is the L layer. The rubbing direction of an upper film substrate of the green liquid crystal display element 420 is set to the direction of an arrow I of FIG. 15B, and the rubbing direction of a lower film substrate is set to the direction of an arrow J.

On the contrary, the liquid crystal mixture of the red liquid crystal display element 430 is the R layer. The rubbing direction of an upper film substrate of the red liquid crystal display element 430 is set to the direction of an arrow K of FIG. 15C, and the rubbing direction of a lower film substrate is set to the direction of an arrow L shifted from the direction of the arrow K by 90 degrees. That is, the rubbing directions of the red liquid crystal display element 430 are different from those of the blue and the green liquid crystal display elements 410 and 420 by 45 degrees.

In the present embodiment, among blue, green and red, the optical rotations of the blue and the red liquid crystal display elements in which the difference of the reflective wavelength is relatively large is set the same, and only the optical rotation of the green liquid crystal display element is set so as to be different from them. Thereby, the reflective efficiency of the light of each color is improved.

Figure 16:
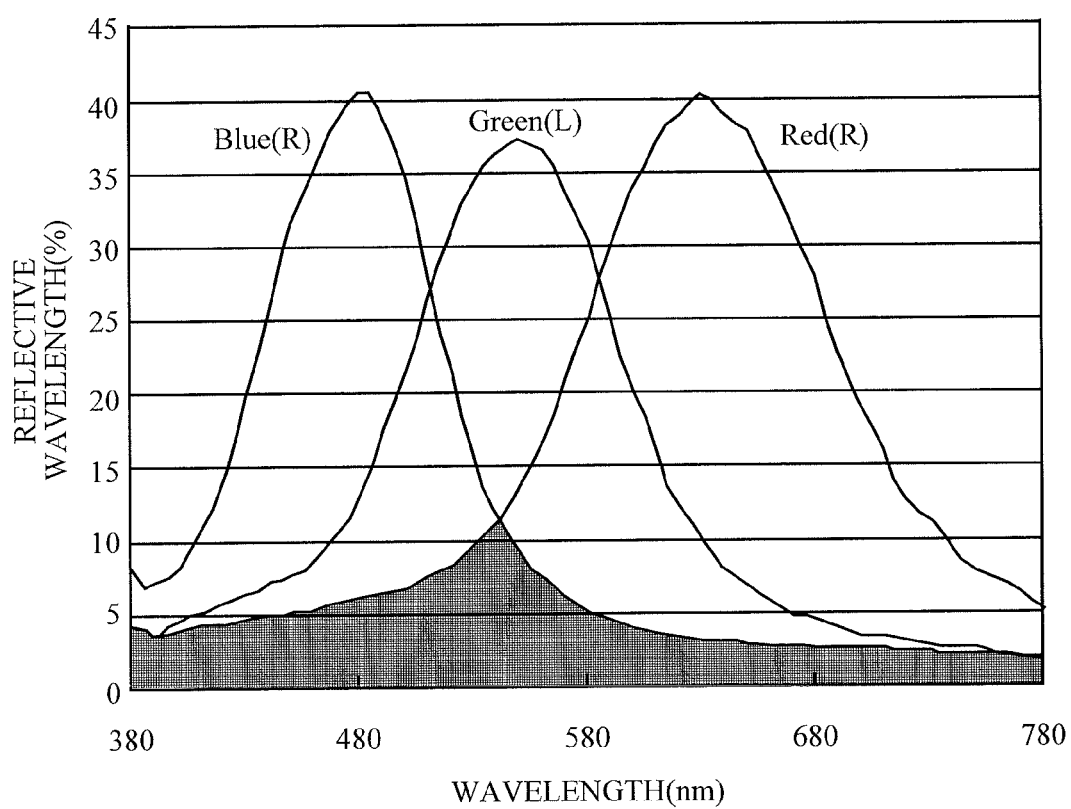
FIG. 16 is a diagram illustrating a reflection spectrum of each display element of the liquid crystal display device.

The reflection spectrums of each display element of the liquid crystal display device have many overlapping portions, as illustrated in FIG. 16 (in FIG. 16, hatching is given to the overlapping portions of green and red). Thus, if the light is reflected in the upper layer when the reflection spectrums overlap, in the lower layer, the light to be reflected decreases, and the reflective efficiency decreases to thereby be dark display. Therefore, in the present embodiment, the directions of the rubbing processes of the liquid crystal display elements 410 and 430 in which the optical rotations of the reflected lights are the same are set to so as to be different from each other, so that the reflectance is improved efficiently.

Figure 17:
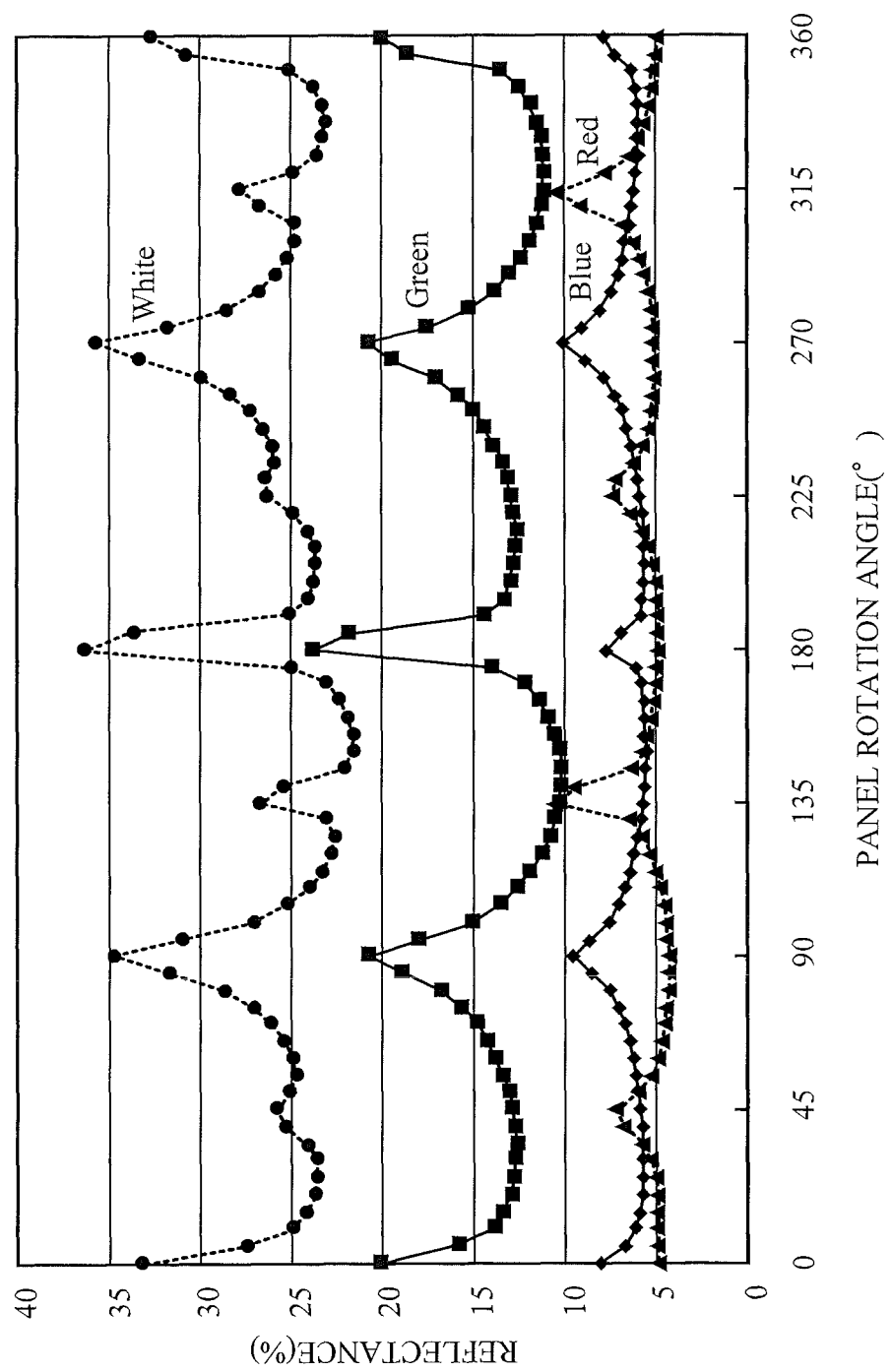
FIG. 17 is a diagram illustrating the reflectance of the reflected light for each panel rotation angle of white, green, blue and red in the liquid crystal display device according to the fourth embodiment.
Figure 18A:
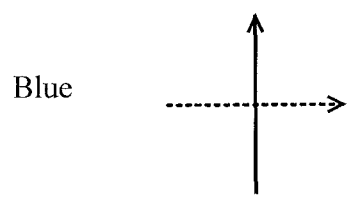
FIGS. 18A to 18C are diagrams illustrating directions of the rubbing process in a comparative example.
Figure 18B:
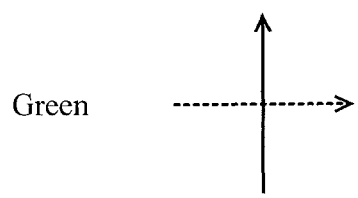
Figure 18C:
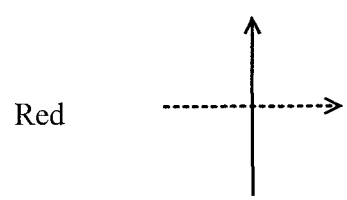
Figure 19:
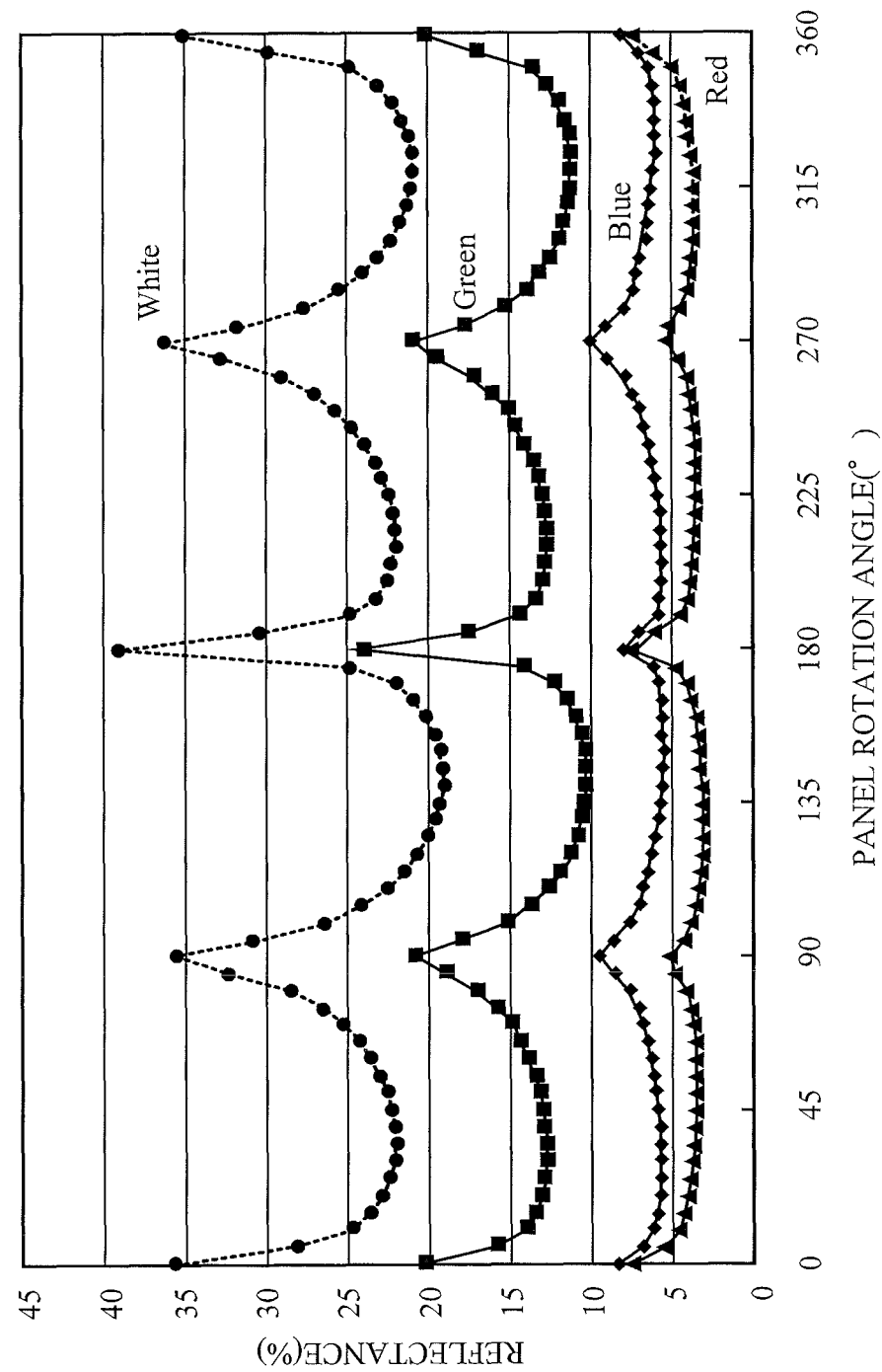
FIG. 19 is a diagram illustrating the reflectance of the reflected light for each panel rotation angle of white, green, blue and red in the comparative example 1.

Specifically, by employing the configuration as described above, reflection angles in which the brightness of the green and blue reflected lights reaches peaks can be set so as to be different from reflection angles in which the brightness of the red reflected light reaches peaks, as illustrated in FIG. 17. It is noted that although in FIG. 17, a horizontal axis is set as a "panel rotation angle" and the vertical axis is set as the "reflectance", these are synonymous with the "brightness measurement direction" and the "brightness" used in the above-mentioned first to third embodiments. Thereby, the red can be reflected efficiently (with high reflectance) at an angle with weak blue reflection, as compared with the brightness (FIG. 19) of the reflected light of each color obtained when the rubbing directions of all the elements are the same direction, as illustrated in a comparative example 1 of FIGS. 18A to 18C. As is clear from comparing FIG. 19 with FIG. 17, in white display, the bright display can also be achieved as a whole.

Figure 20A:
FIGS. 20A to 20C are diagrams illustrating directions of the rubbing process in an variation example 1 of the fourth embodiment.
Figure 20B:
Figure 20C:
Figure 21:
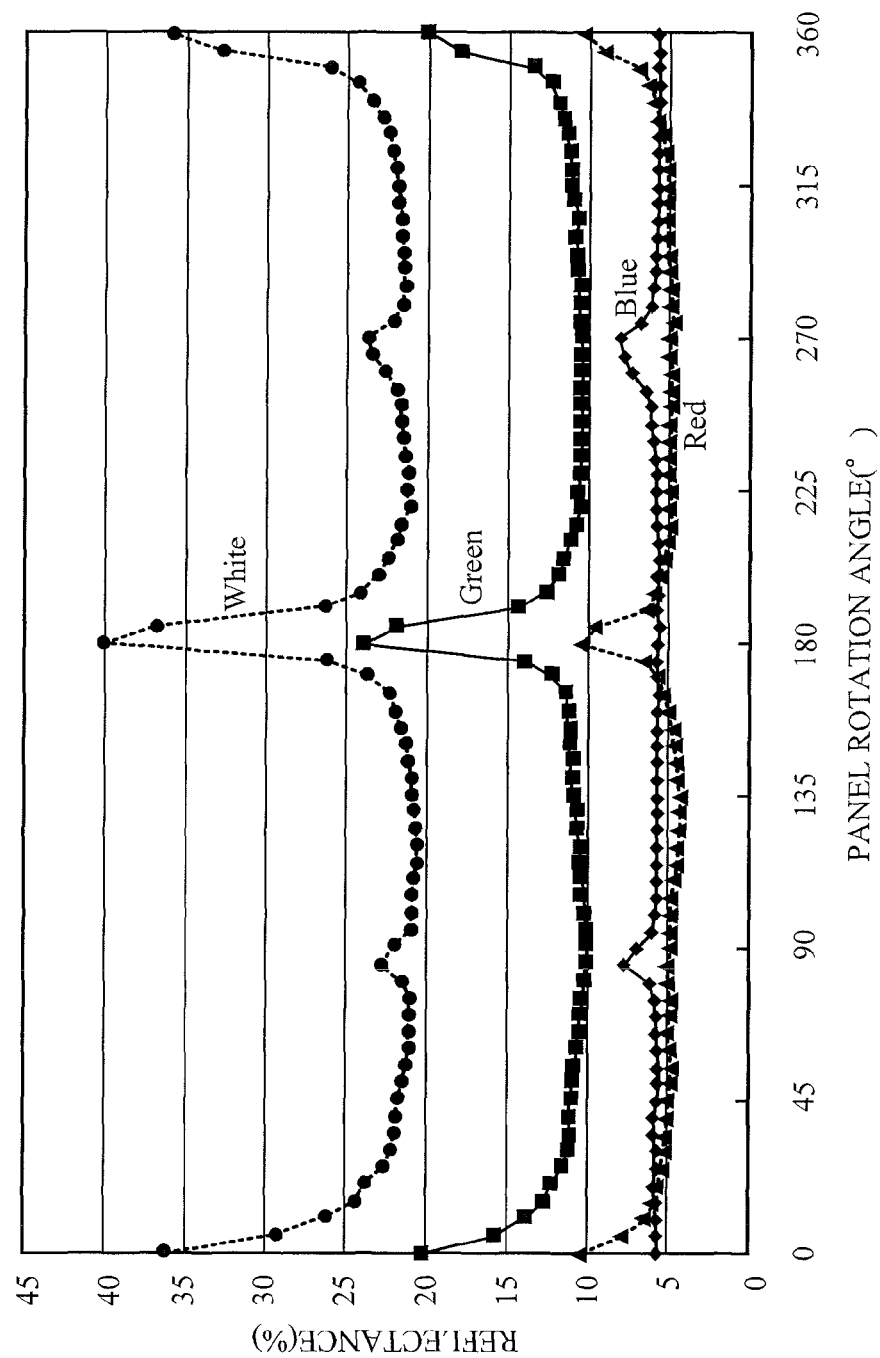
FIG. 21 is a diagram illustrating the reflectance of the reflected light for each panel rotation angle of white, green, blue and red in the variation example of the fourth embodiment.
Figure 22A:
FIGS. 22A to 22C are diagrams illustrating directions of the rubbing process in a comparative example 2.
Figure 22B:
Figure 22C:
Figure 23:
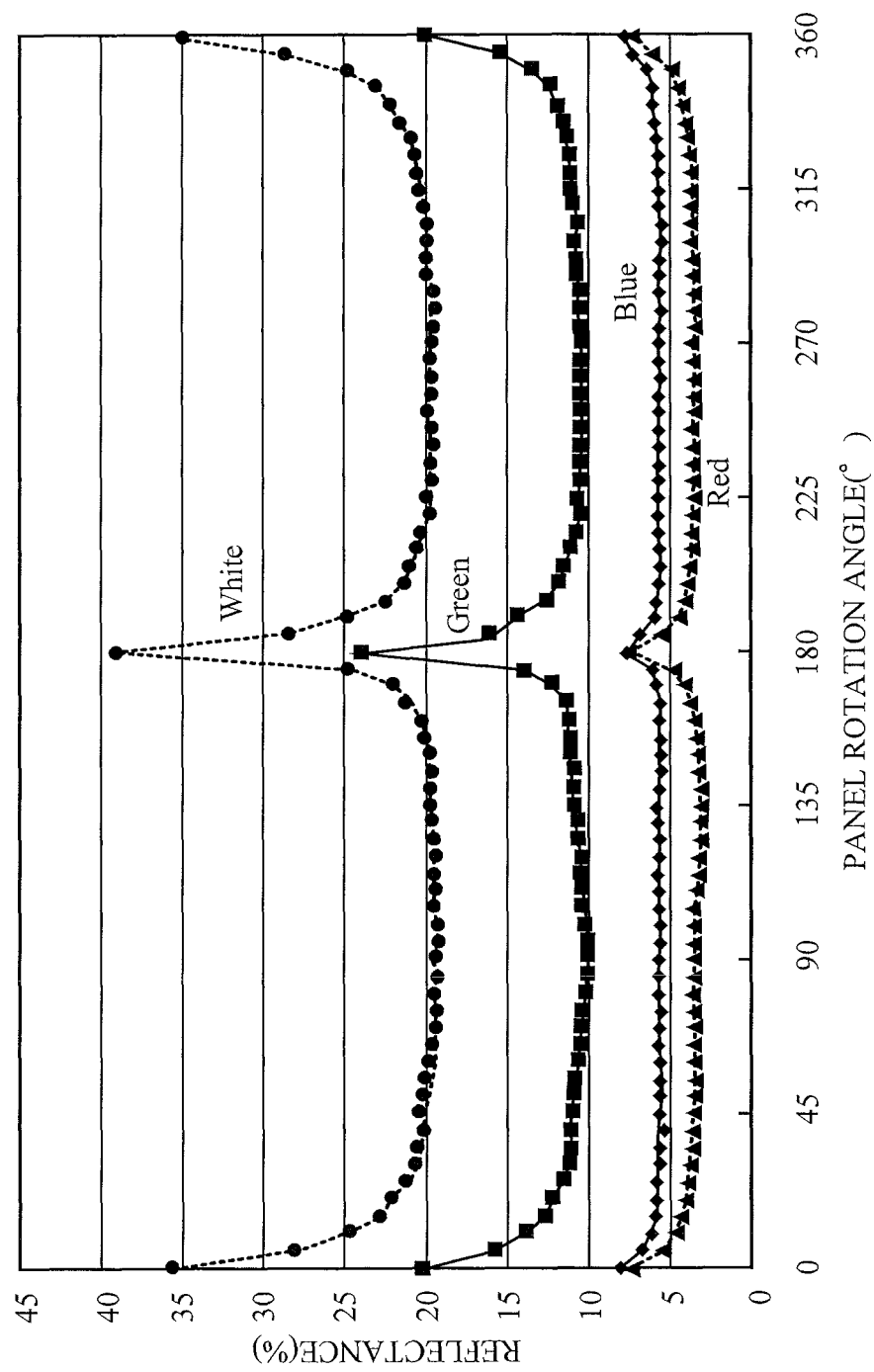
FIG. 23 is a diagram illustrating the reflectance of the reflected light for each panel rotation angle of white, green, blue and red in the comparative example 2.

In addition, the above-mentioned fourth embodiment has explained the case where the rubbing directions of the upper and the lower film substrates of each liquid crystal display element intersect, but the rubbing directions are not limited to these and may be the same direction as illustrated in FIGS. 20A to 20C. To set the rubbing directions of the upper and the lower film substrates to the same direction is called parallel rubbing. In this example, the rubbing directions of the blue and the green liquid crystal display elements 410 and 420 (see FIGS. 20A and 20B) are set so as to be different from the rubbing directions of the red liquid crystal display elements 430 (see FIG. 20C) by 90 degrees. Also by doing so, the observation directions (angles) in which the brightness of the green and blue reflected lights becomes peaks can be set so as to be different from the observation directions (angles) in which the brightness of the red reflected light becomes peaks, as illustrated in FIG. 21. Thereby, the red can be reflected efficiently (with high reflectance) at an angle with weak blue reflection, as compared with a graph (FIG. 23) obtained when the rubbing directions of all the elements are the same direction, as illustrated in a comparative example 2 of FIGS. 22A to 22C. As is clear from comparing FIG. 23 with FIG. 21, in white display, the bright display can also be achieved as a whole.

In addition, the above-mentioned fourth embodiment and variation examples have explained the case where the rubbing directions of the blue and the green liquid crystal display elements are set so as to be different from those of the red liquid crystal display element by 45 or 90 degrees, but the rubbing directions are not limited to these. The former rubbing directions may be set so as to be different from the latter rubbing directions by other angle (e.g. 30 degrees).

In addition, the above-mentioned fourth embodiment and variation examples have explained the case where the rubbing directions of the blue and the green liquid crystal display elements are the same, but the rubbing directions are not limited to these and these rubbing directions may be set so as to be different from each other. In this case, the rubbing directions of each of the blue, the green and the red liquid crystal display elements may be shifted by 30 degrees.

In addition, the above-mentioned fourth embodiment has explained the case where the blue, the green and the red are selectively reflected, but colors are not limited to these and other colors may be selectively reflected. Moreover, the number of stacks of the liquid crystal display elements is not limited to three layers, either.

Further, in the first to fourth embodiments, the condensing direction of the reflected light is adjusted by the rubbing process, but the adjustment method is not limited to this and the condensing direction of the reflected light may be adjusted by sticking oriented films on the respective film substrates.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A liquid crystal display device comprising:
    a liquid crystal display element that includes a liquid crystal layer, and an upper substrate and a lower substrate opposed to each other via the liquid crystal layer, a plurality of liquid crystal display elements being stacked;
    wherein a condensing direction of a reflected light by directional control in at least one of the liquid crystal display elements is different from a condensing direction of a reflected light by directional control in at least one of another liquid crystal display elements.

2. The liquid crystal display device as claimed in claim 1, where the liquid crystal layer is a cholesteric liquid crystal layer in which a dominant wavelength of selective reflection is a visible light domain.

3. The liquid crystal display device as claimed in claim 1, wherein the directional control is performed by rubbing processes to the upper substrate and the lower substrate.

4. The liquid crystal display device as claimed in claim 3, wherein a direction of the rubbing process to the upper substrate is different from a direction of the rubbing process to the lower substrate by 90 degrees.

5. The liquid crystal display device as claimed in claim 1, wherein the condensing direction of the reflected light by the directional control in at least one of the liquid crystal display elements is different from the condensing direction of the reflected light by the directional control in at least one of another liquid crystal display elements by 45 degrees.

6. The liquid crystal display device as claimed in claim 1, wherein optical rotations of the reflected lights of both liquid crystal display elements are different from each other, the condensing directions of the reflected lights by the directional control in the both liquid crystal display elements being different from each other.

7. The liquid crystal display device as claimed in claim 1, wherein the liquid crystal display elements of two layers are stacked,
    one of the liquid crystal display elements includes a red liquid crystal portion that reflects a red light, and a first green liquid crystal portion that reflects a green light,
    another one of the liquid crystal display elements includes a blue liquid crystal portion that corresponds to the red liquid crystal portion and reflects a blue light, a second green liquid crystal portion that corresponds to the first green liquid crystal portion and reflects the green light, and
    the optical rotations of the reflected lights of the red and the blue liquid crystal portions are the same as each other, and the optical rotations of the reflected lights of the first and the second green liquid crystal portions are different from each other.

8. The liquid crystal display device as claimed in claim 7, wherein an area ratio between the red and the first green liquid crystal portions in the one of the liquid crystal display elements, and an area ratio between the blue and the second green liquid crystal portions in the another one of the liquid crystal display elements are each 2:1.

9. The liquid crystal display device as claimed in claim 1, wherein the liquid crystal display elements include a blue liquid crystal display element that reflects a blue light, a green liquid crystal display element that reflects a green light, and a red liquid crystal display element that reflects a red light, and
    the condensing directions of the reflected lights by the directional control in the blue and the red liquid crystal display elements are different from each other.

* * * * *